United States Patent
Suzuki et al.

(10) Patent No.: US 11,573,609 B2
(45) Date of Patent: Feb. 7, 2023

(54) AMBIENT ILLUMINANCE AND LIGHT GEOMETRY DETECTION

(71) Applicant: Microsoft Technology Licensing, LLC, Redmond, WA (US)

(72) Inventors: Nobuyuki Suzuki, Kirkland, WA (US); Mony Rith Chhen, Kent, WA (US); Wenfeng Liu, Woodinville, WA (US); Samu Matias Kallio, Redmond, WA (US); Kari Jussi Ropo, Redmond, WA (US); Mika Ylitalo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/332,434

(22) Filed: May 27, 2021

(65) Prior Publication Data
US 2022/0382335 A1 Dec. 1, 2022

(51) Int. Cl.
*G09G 5/00* (2006.01)
*G06F 1/16* (2006.01)
(Continued)

(52) U.S. Cl.
CPC .......... *G06F 1/1677* (2013.01); *G01J 1/4204* (2013.01); *G01J 1/4228* (2013.01); *G09F 9/301* (2013.01)

(58) Field of Classification Search
CPC ...... G09F 9/301; G06F 1/1641; G06F 1/1652; G06F 1/1677; G01J 1/4204; G01J 1/4228
See application file for complete search history.

(56) References Cited

U.S. PATENT DOCUMENTS

| 6,559,837 B1 * | 5/2003 | Lasneski | H04N 5/20 348/E5.073 |
| 8,264,437 B2 | 9/2012 | Nitanda | |

(Continued)

FOREIGN PATENT DOCUMENTS

| CN | 111857368 A | 10/2020 |
| JP | 2010146179 A | 7/2010 |

OTHER PUBLICATIONS

P, Daniel, "Note 7 may be first with two ambient lights sensors for precise autobrightness settings", Retrieved from: https://www.phonearena.com/news/Note-7-may-be-first-with-two-ambient-lights-sensors-for-precise-autobrightness-settings_id84018, Aug. 10, 2016, 12 pages.

(Continued)

*Primary Examiner* — Joe H Cheng
(74) *Attorney, Agent, or Firm* — Holzer Patel Drennan

(57) ABSTRACT

The ambient illuminance and light geometry detection system includes a computing process including receiving a hinge angle between two displays of a foldable computing device, illuminance values from illuminance sensors of the displays, and screen activity of each of the displays of the foldable computing device, determining foldable computing device posture information based at least in part on the hinge angle and the screen activity of each of the displays, determining a user facing display of the foldable computing device based at least in part on the device posture information and the screen activity of the displays, assigning differential weights to an illuminance value received from an illuminance sensor of the user facing display compared to an illuminance value received from an illuminance sensor of the non-user facing display and generating an aggregate weighted average illuminance by applying the differential weights to the illuminance values of each of the displays.

18 Claims, 13 Drawing Sheets

(51) Int. Cl.
*G09F 9/30* (2006.01)
*G01J 1/42* (2006.01)

(56) References Cited

U.S. PATENT DOCUMENTS

| | | | |
|---|---|---|---|
| 8,686,981 B2 | 4/2014 | Barnhoefer et al. | |
| 9,612,625 B2 | 4/2017 | Oliver et al. | |
| 9,747,868 B2 | 8/2017 | Lee et al. | |
| 10,345,151 B1 | 7/2019 | Sarkar et al. | |
| 10,346,117 B2 | 7/2019 | Sylvan et al. | |
| 10,403,189 B2 | 9/2019 | Aurongzeb et al. | |
| 2009/0303216 A1* | 12/2009 | Shin | G09G 3/3406 |
| | | | 345/207 |
| 2011/0249042 A1* | 10/2011 | Yamamoto | G09G 3/342 |
| | | | 345/690 |
| 2012/0001949 A1* | 1/2012 | Seki | G09G 5/10 |
| | | | 345/690 |
| 2013/0162580 A1 | 6/2013 | Honda | |
| 2014/0285449 A1* | 9/2014 | Cho | G06F 3/0416 |
| | | | 345/173 |
| 2014/0375219 A1* | 12/2014 | Lee | G09G 3/20 |
| | | | 315/153 |
| 2019/0278323 A1* | 9/2019 | Aurongzeb | G06F 1/3265 |
| 2020/0265799 A1* | 8/2020 | Choi | G09G 3/20 |
| 2021/0088379 A1 | 3/2021 | Liu et al. | |
| 2021/0248942 A1* | 8/2021 | Yoon | G01B 7/30 |
| 2021/0294926 A1* | 9/2021 | Duffy | G06F 1/1618 |
| 2022/0229466 A1* | 7/2022 | Yildiz | G09G 3/035 |

OTHER PUBLICATIONS

"Samsung Galaxy Z Fold2 review". Retrieved from: https://www.gsmarena.com/samsung_galaxy_z_fold2-review-2164p3.php, Sep. 11, 2020, 21 Pages.

Soneira, Aymond M., "BrightnessGate for the iPhone & Android Smartphones and HDTVs—Why Existing Brightness Controls and Light Sensors are Effectively Useless", Retrieved from: https://web.archive.org/web/20101029144712/https://www.displaymate.com/AutoBrightness_Controls_2.htm, Oct. 29, 2010, 7 Pages.

"International Search Report and Written Opinion Issued in PCT Application No. PCT/US22/026869", dated Aug. 16, 2022, 21 Pages.

* cited by examiner

AMBIENT ILLUMINANCE AND LIGHT GEOMETRY DETECTION

BACKGROUND

Computing devices with displays may use a light sensor to trigger an adjustment of the brightness of the display. For example a computing device such as a laptop, a tablet device, a mobile phone, etc., may include a light sensor that senses the ambient light and provide the information about the ambient illuminance to a processor of the computing device. The processor may use the information about the ambient illuminance to change one or more parameter controlling a display of the computing device. For example, of the information about the ambient illuminance indicates low level of illuminance, the brightness to a processor of a laptop, the processor may increase the brightness of the screen by increasing common voltage or other input provided to illuminate pixels of an LCD screen.

SUMMARY

The ambient illuminance and light geometry detection system includes a computing process including receiving a hinge angle between two displays of a foldable computing device, illuminance values from illuminance sensors of the displays, and screen activity of each of the displays of the foldable computing device, determining foldable computing device posture information based at least in part on the hinge angle and the screen activity of each of the displays, determining a user facing display of the foldable computing device based at least in part on the device posture information and the screen activity of the displays, assigning differential weights to an illuminance value received from an illuminance sensor of the user facing display compared to an illuminance value received from an illuminance sensor of the non-user facing display and generating an aggregate weighted average illuminance by applying the differential weights to the illuminance values of each of the displays.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
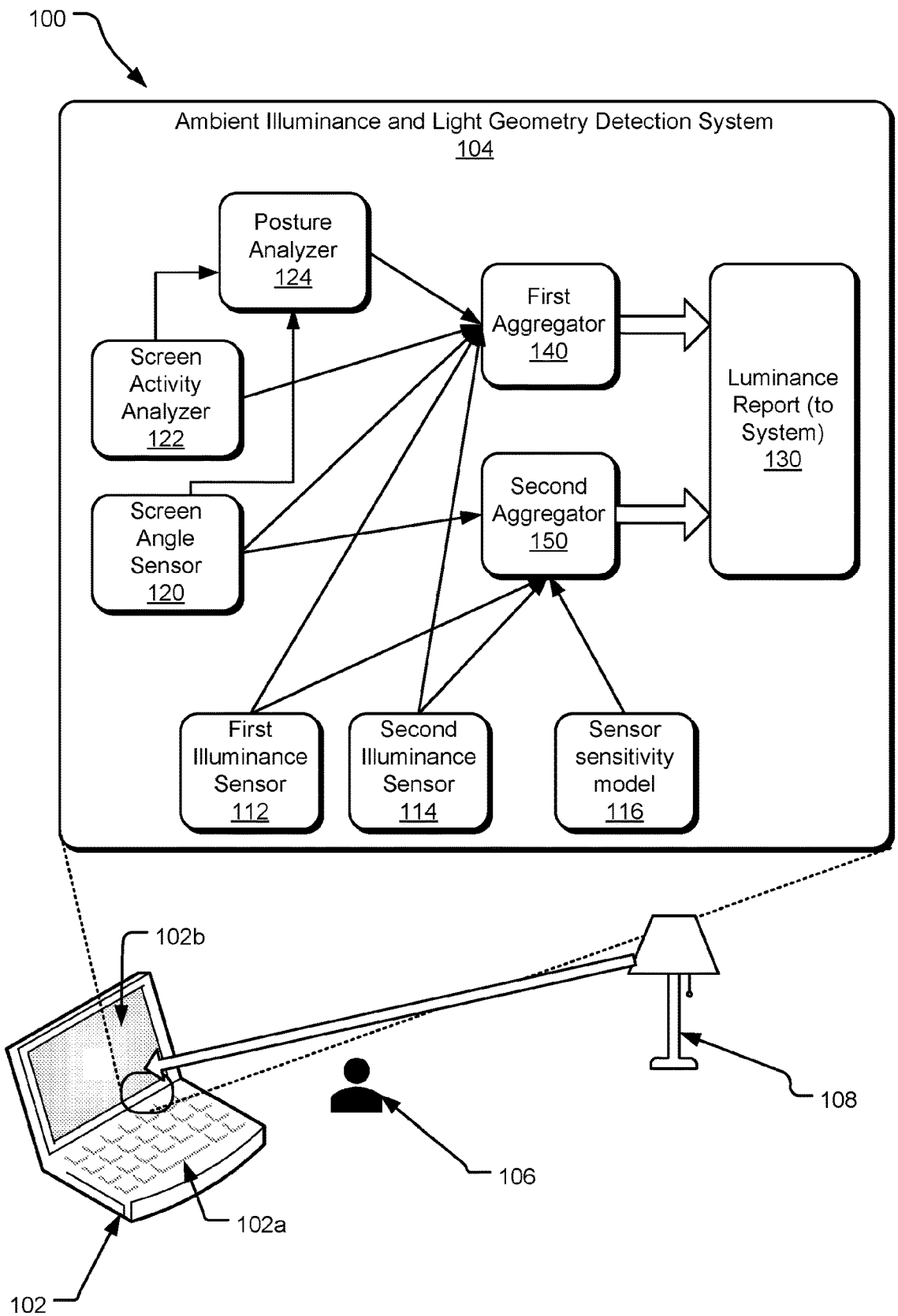
FIG. 1 illustrates an example block diagram of an ambient illuminance and light geometry detection (AILGD) system disclosed herein.

Computing devices are used by users in all kinds of different environments. For example, users use laptops, PCs, tablet devices, cellular phones, or other computing devices in various different environments such as offices, conference rooms, homes, at restaurants and coffee shops, outdoor venues, etc.

In handheld computing devices equipped with multiple screens, such as foldable dual screen device and bendable screen device with the sub screen, it is commonly seen that the system equips multiple ambient illuminance sensors corresponding to each screen. Such foldable devices may also have a hinge angle sensor that determines the opening angle of the computing device Implementations disclosed herein provides solutions that reduces the impact of movement by humans, or other objects, that may result in rapid changes in the levels of illuminance detected by a computing device. Specifically, the implementations include a light sensor to detect ambient illuminance and a human presence sensor. In one implementation, the light sensor and the human presence sensor are implemented on the computing device, however, alternatively one or both of these sensors may be implemented on a device different than the computing device and communicatively connected to the computing device. Various computing instructions stored on the computing device process the output from the light sensor and the human presence sensor to determine if an hysteresis filter is to be applied to the illuminance signal to reduce variations therein.

The technology disclosed herein solves a technical problem of managing brightness of a computing device screen when a foldable computing device is used in different postures and when each of the two displays of the foldable computing device has different levels of activity as well as different sensitivity to the ambient light incident upon them. Specifically, the technology disclosed herein determines the posture of the foldable computing device based at least in part on the screen angle and activity levels on each of the displays. Furthermore, the posture information is used to determine the user facing display of the foldable computing device and then differential weights are assigned to the illuminance values received from the illuminance sensors of the displays. The differential weights are used to generate an aggregate weighted average illuminance level that can be used to control the common voltage levels (VCO) for the pixels of at least one of the displays.

For example, when higher weight is allocated to the illuminance level received from a sensor with active display, it results in the operating system of the computing device adjusting the VCO levels such that the user has a better experience in viewing the active screen content. Similarly, if lower weight is allocated to illuminance levels from a screen, which based on the posture information, is determined to be not user facing, the adjustment to the VCO levels as determined by the operating system are more beneficial for the user experience of the display screen that is user facing.

Furthermore, AILGD system disclosed herein also references a sensitivity model providing sensitivity of the illuminance values received from illuminance sensors to incident light angles for the sensors to determine an incident angle based at least in part on a ratio of the illuminance values received from illuminance sensors of the non-user facing display and the sensor sensitivity model. Subsequently, the illuminance values received from illuminance sensors are scaled using the incident light angles for the sensors.

The AILGD system disclosed herein provides technical advantage over the existing systems where the posture of the foldable computing device and the sensitivity model of its sensors are not used in generating luminance report for the operating system of the foldable computing device. For example, in foldable systems used in different postures such as book posture or tent posture, the sensor facing direction is different from the user facing direction, causing a huge error in the screen luminance adaptation that results in a harmfully strong screen luminance or an unusable dark screen illumination. The AIGLD system disclosed herein avoids such harmfully strong screen luminance or an unusable dark screen illumination.

Furthermore, when the geometry of light incident upon the sensors or the foldable computing device is unconventional, such as when the light source is behind a user of the foldable computing device, the sensor system of the conventional foldable computing system is not able to estimate the ambient illuminance intensity, resulting in unreasonable screen luminance adaptation, and harming the user experience of the screen usage with the luminance adaptation. Compared to that, the AIGLD system disclosed herein provides a better screen luminance adaptation and user experience.

FIG. 1 illustrates a block diagram of an ambient illuminance sensor system 100 disclosed herein. Specifically, the ambient illuminance sensor system 100 illustrates a computing device 102 being used by a user 106 that receive ambient illuminance from a light source 108. The mobile device 102 may have an AILGD system 104 configured therein. The computing device 102 is illustrated to be a laptop, however, in an alternative implementation, the computing device 102 may be a mobile device, a computer, a tablet, or other computing device. In one implementation disclosed herein, the computing device 102 has two screens.

The AILGD system 104 may be configured using a number of computer programmable instructions stored on a memory of the computing device 102 where these computer programmable instructions may be executed using a processor of the computing device 102. The AILGD system 104 may also have two ambient illuminance sensors 112 and 114 that senses the level of ambient illuminance in the vicinity of the computing device 102. For example, the first illuminance sensor 112 may be implemented on a first screen or fold of the computing device 102 whereas the second illuminance sensor 112 may be implemented on a second screen or fold of the computing device 102.

The first and the second illuminance sensors 112 and 114 may be implemented using any light sensor that measures the level of illuminance in the vicinity of the computing device 102 in lux or other appropriate units. The illuminance sensors 112 and 114 may be implemented using a photo-voltaic light sensor, a phototube, a photo-emissive device, a photo-conductive device, a photo-junction device, a light-detective resistor, a photodiode, a photo-transistor, etc. In one implementation, the illuminance sensors 112 and 114 may generate a series of illuminance values measured at a predetermined time period, such as every millisecond (ms), every second, etc. These series of illuminance values may be used by an operating system of the computing device 102 to adjust illuminance levels of each output screens. In an alternative implementation, the illuminance sensors 112 and 114 may also measure the chromaticity of the ambient light in the vicinity of the computing device 102.

Furthermore, the AILGD system 104 may also have a screen angle sensor 120 that senses the angle between two screens of the computing device 102. For example, such screen angle sensor 120 may be implemented using a hinge between the two screens of the computing device 102 and determining the screen angle based at least in part on data received from the hinge. The hinge angle sensor 120 may provide information about the extent of the angle to which the computing device is open. For example, when the device is opened in flat position, the hinge angle sensor 120 denotes the angle to be 180 degrees. The angle may vary generally between substantially under 90 degrees to as much as 360 degrees.

Furthermore, a screen activity analyzer 122 of the computing device 102 may determine which of the two screens of the computing device 102 is in active, inactive, or relatively more active than the other screen of the computing device 102. For example, when the computing device 102 is being used in a read mode, only one of the screens maybe actively used. On the other hand, if the user is typing data using one of the screens, both screens may be used substantially to a similar extent.

Furthermore, a posture analyzer 124 of the computing device 102 determines a use mode of the computing device 102. The posture analyzer 124 receives input from the hinge angle sensor 120 and the screen activity analyzer 122 to estimate whether the computing device 102 is placed like a laptop with one screen facing the user and the other screen facing a ceiling, which may include a light source such as a ceiling light. Alternatively, the posture analyzer 124 may determine that the computing device 102 is being used in a book posture or a tent posture wherein an illuminance sensor facing direction is completely off to a user facing direction. Other postures maybe, for example, book posture where the computing device 102 is in a flattened form, a tent posture where the computing device 102 is in a standing form, etc.

A sensor sensitivity model 116 stores the sensitivity characteristics of the first illuminance sensor 112 and the second illuminance sensor 114 an angle at which the first illuminance sensor 112 and the second illuminance sensor 114 receives light from an external source. For example, an example sensor sensitivity model 116 may be illustrated by a graph 800 illustrated in FIG. 8 which indicates the illuminance signal generated by the illuminance sensor 112 or 114 as function of the light incidence angle between 0 and 180 degrees, with the highest level of signal, substantially one (1) generated at 90 degrees of light incidence angle and lowest levels of signal, substantially zero (0) generated at 0 degree or 180 degree of light incidence angle.

A first aggregator 140 receives outputs from each of the first and second illuminance sensors 112, 114, the screen angle sensor 120, the screen activity analyzer 122, and the posture analyzer 124. The first aggregator 140 aggregates these inputs to determine the user facing ambient illuminance value. The user facing ambient illuminance value may be used by the first aggregator 140 to average the illuminance data output by the first illuminance sensor 112 and the second illuminance sensor 114. The first aggregator 140 also analyzes the output from the screen activity analyzer 122 to determine if either display of the computing device 102 that is not user facing and therefore inactive.

Using the input from the screen activity analyzer 122 by the first aggregator 140 to determine the user facing ambient illuminance value provides a better user experience as it takes into consideration which of the two screens of the computing device 102 is in active, inactive, or relatively more active than the other screen of the computing device 102. Thus, if the user was using the computing device in a read mode when one of the screen is actively used, the user facing ambient illuminance value is more reflective of the illuminance value of such active screen.

For example, the screen activity analyzer 122 may receive inputs from a screen activity subsystem from a first display and a screen activity subsystem from a second display of the computing device 102 regarding the screen activity of each of the two displays of the computing device 102. The first aggregator 140 uses this information to prioritize ambient illuminance value output from a sensor of the display that is active. Thus, if a display including 102a including the first illuminance sensor 112 is active but a display 102b including the second illuminance sensor 114 is inactive, the illuminance value output from the first illuminance sensor 112 is prioritized over the illuminance value output from the second illuminance sensor 114. In one implementation, prioritizing the illuminance value output from an illuminance sensor may include weighing the illuminance value with a higher weight compared to illuminance value from the other illuminance sensor.

The first aggregator 140 uses such differential weight values for weighing the illuminance values output from each of the illuminance sensors 112 and 114 to generate an aggregated weighted-average ambient illuminance sensor value. Specifically, the weights assigned to the illuminance values are based at least in part on the posture of the computing device 102, as determined based at least in part on the screen activity of the displays 102a and 102b, and the output from the screen angle sensor 120. For example, if the computing device 102 is used in a laptop mode with the display 102b facing the user 106 and the display 102a facing a ceiling, the weight assigned to the illuminance value generated by the first illuminance sensor 112 associated with the display 102b may be higher compared to the weight assigned to the illuminance value generated by the second illuminance sensor 114 associated with the display 102a.

The aggregated weighted-average ambient illuminance sensor value is communicated as part of a luminance report 130 to the operating system of the computing device 102. A use case illustrating the functioning of the first aggregator 140 is disclosed in further detail below in FIG. 5.

A second aggregator 150 receives outputs from each of the first illuminance sensor 112, the second illuminance sensor 114, the sensor sensitivity model 116, and the screen angle sensor 120. The sensor sensitivity model 116 may store data providing relation between sensitivity of the illuminance sensors 112, 114 to an incident light angle. An example of such model is illustrated by a graph disclosed below in FIG. 8. Specifically, when the two sensors, such as the first and second illuminance sensors 112, 114 are facing one light source, such as the light source 108, because of the sensor sensitivity characterized by the sensor sensitivity model 116, the relation between the illuminance values generated by the first and second illuminance sensors 112, 114 varies in the manner described in FIG. 9 below. The second aggregator 150 recognizes the light geometry between the first and second illuminance sensors 112, 114 based at least in part on the relative angle between the displays having the first and second illuminance sensors 112, 114, as provided by the screen angle sensor 120.

Specifically, the second aggregator 150 first calculates a ratio of the illuminance values generated by the first illuminance sensor 112 and the second illuminance sensor 114. Subsequently, the second aggregator 150 looks up the sensor sensitivity model 116 to find an incident angle pair that coincides with the ratio of the illuminance values. For example, if the ratio is one (1), the incident angle is substantially equal to ninety (90) degrees. However, if the ratio is 0.5, the incident angle may be substantially equal to either thirty (3) degrees or one-hundred and fifty (150) degrees.

Subsequently, the second aggregator 150 takes into account the angle between the two displays 102a and 102b, which may be provided by the screen angle sensor 120, to estimate the incident light angles for sensors on each of the first display 102a and the second display 102b. Next, the actual illuminance values as provided by the first illuminance sensor 112 and the second illuminance sensor 114 are scaled using the incident light angles. The scaled illuminance values are reported to the operating system of the computing device 102 as part of the luminance report 130. Thus, by estimating the light geometry, the second aggregator 150 is able to precisely estimate the ambient illuminance intensity that may be used for the screen luminance adaptation by the operating system of the computing device 102.

The operating system of the computing device 102 may use the illuminance report 130 to determine various parameters of the computing device or its components. For example, the common voltage levels (VCO) for the pixels of an output screen of the computing device 102 may be determined using the illuminance report 130. As the second aggregator 150 takes into account the light geometry associated with the illuminance sensors 112 and 114, it reports quite constant ambient illuminance data across different hinge angles, which allows the display subsystem of the computing device 102 to adapt the display luminance accurately to the ambient illuminance levels.

Figure 2:
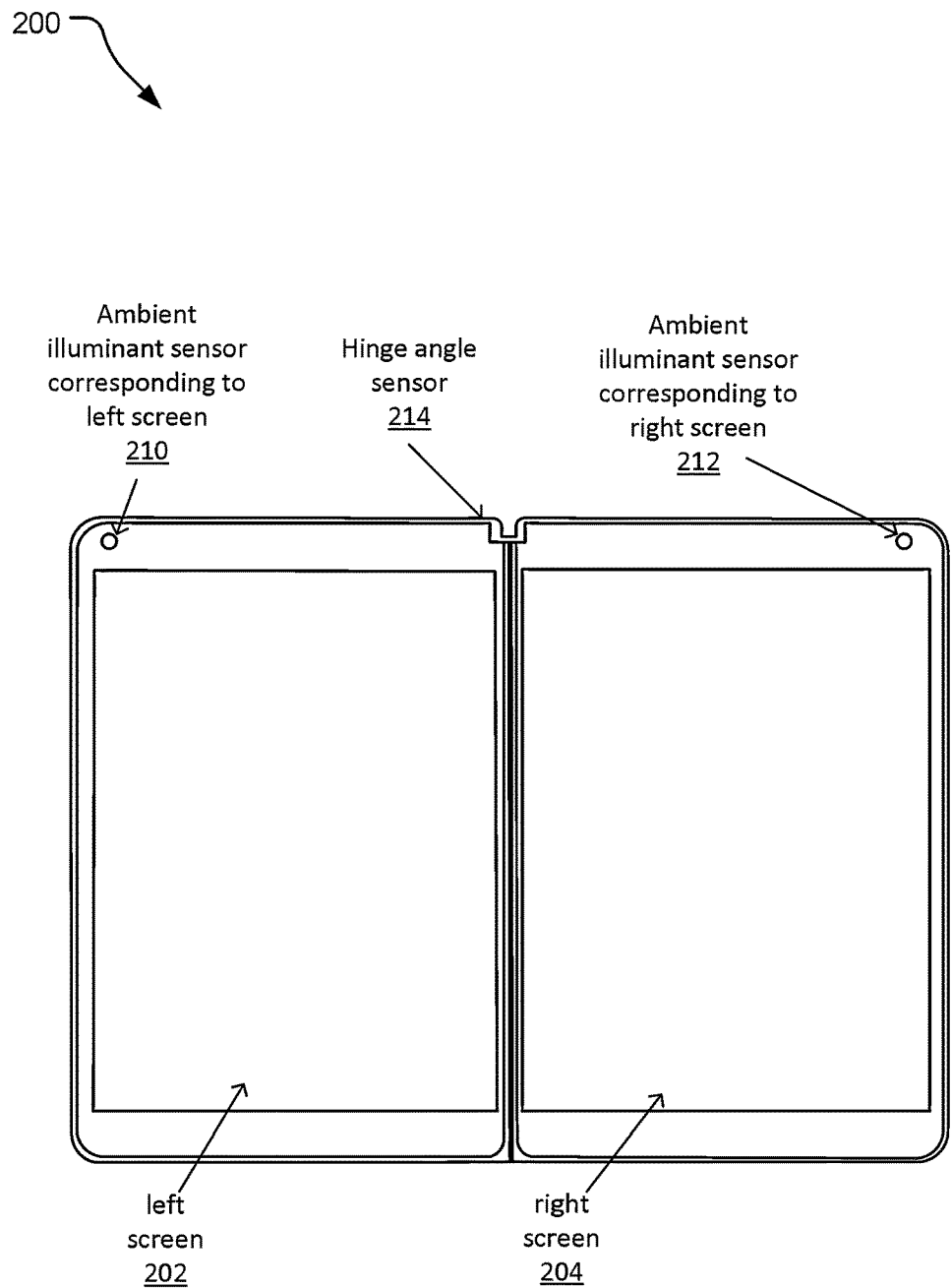
FIG. 2 illustrates example computing device with illuminance sensors and a hinge angle sensor using the AILGD system disclosed herein.

FIG. 2 illustrates example computing device 200 with illuminance sensors and a hinge angle sensor using the AILGD system disclosed herein. The computing device 200 may have a left screen 202 and a right screen 204, each including an illuminance sensor. Specifically, the left screen 202 includes a left screen illuminance sensor 210 and the right screen 204 includes a right screen illuminance sensor 212. A hinge angle sensor 214 may generate information about the hinge angle between the left screen 202 and the right screen 204. Each of the left screen illuminance sensor 210 and the right screen illuminance sensor 212 generates illuminance values that are used by the aggregators of the AIGLD system disclosed herein to generate a luminance report for the operating system of the computing device 200.

Figure 3:
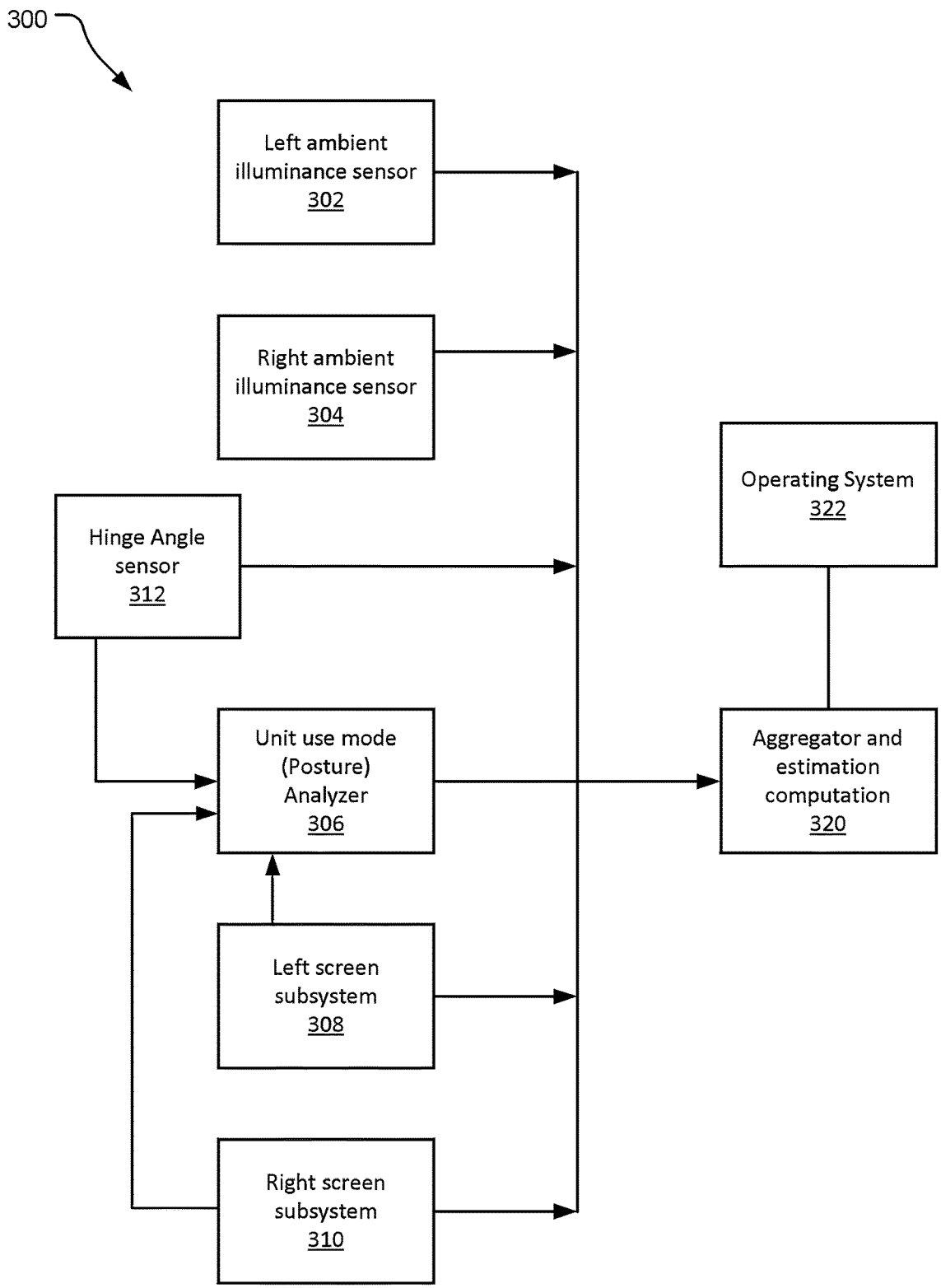
FIG. 3 illustrates example block diagram of the system with components implementing the AILGD system disclosed herein.

FIG. 3 illustrates example block diagram of a first aggregator subsystem 300 with components implementing the AILGD system disclosed herein. Specifically, the first aggregator subsystem 300 include a left illuminance sensor 302 that generates illuminance values of the light incident upon a left screen of a computing device and a right illuminance sensor 304 that generates illuminance values of the light incident upon a right screen of the computing device. A hinge angle sensor 312 provides value of the hinge angle between the left screen and the right screen. A posture analyzer 306 determines a use mode of the computing device based at least in part on the input from the hinge angle sensor 312 as well as the screen activity from a left screen subsystem 308 and a right screen subsystem 310 to determine the posture of the computing device. In one implementation, determining the screen activity may include determining screen activity level for a predetermined immediate past period. Yet alternatively, determining the screen activity level may include determining the type of screen activity for each of the screens. The type of screen activity may include receiving typed in information from a user, displaying video, displaying pages of a book, etc. In one implementation, the screen activity may also be determined based at least in part on an input from a camera implemented on the screen.

For example, the posture analyzer 306 may see that the hinge angle is 280 degrees and only the right screen is active to determine that the device is being used in a tent posture. Alternatively, the posture analyzer 306 may see that the hinge angle is 180 degrees and both screens are active to determine that the device is being used in a book (flat) posture.

An aggregator and estimation computation block 320 uses the inputs from each of the illuminance sensors 302 and 304, the posture analyzer 306, and the left screen subsystem 308 and the right screen subsystem 310 to determine an aggregated weighted-average ambient illuminance sensor value. This aggregated weighted-average ambient illuminance sensor value is provided to the operating system 322 of the computing device as part of a luminance report. For example, the aggregator and estimation computation block 320 may assign a higher weight to the illuminance value from a screen that is active and/or user-facing compared to the weight assigned to the illuminance value from a screen that is non-active and/or not user-facing.

Figure 4:
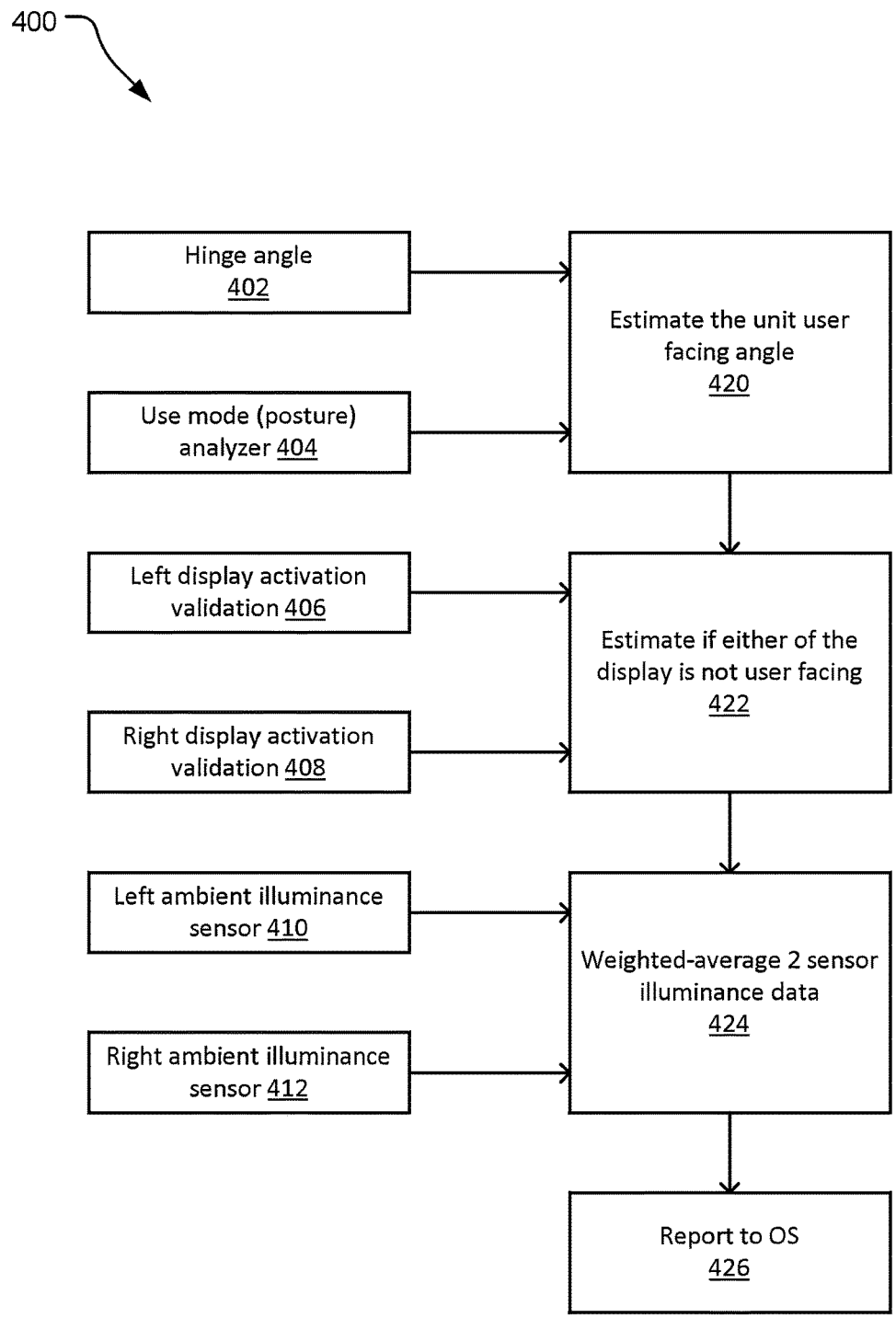
FIG. 4 illustrates example flow of data in a sensor data aggregator of the AILGD system disclosed herein.

FIG. 4 illustrates example flow 400 of data in a sensor data aggregator of the AILGD system disclosed herein. Specifically, an operation 402 generates a hinge angle value and an operation 404 determines a posture of the computing device. The hinge angle and the posture are used by an operation 420 to estimate a user facing angle of the computing device. An operation 406 generates left display activation validation and an operation 408 generates right display activation validation. An operation 422 uses the user facing angle and the display validation information to estimate if either of the left screen and the right screen are not user facing. A left ambient illuminance sensor 410 generates left screen illuminance value and a right ambient illuminance sensor 412 generates right screen illuminance value. An operation 424 uses the left screen illuminance value, the right screen illuminance value, and output from operation 422 to determine weighted average of the two left screen illuminance value and the right screen illuminance value. This weighted average of the two left screen illuminance value and the right screen illuminance value is reported to the operating system by an operation 426.

Figure 5:
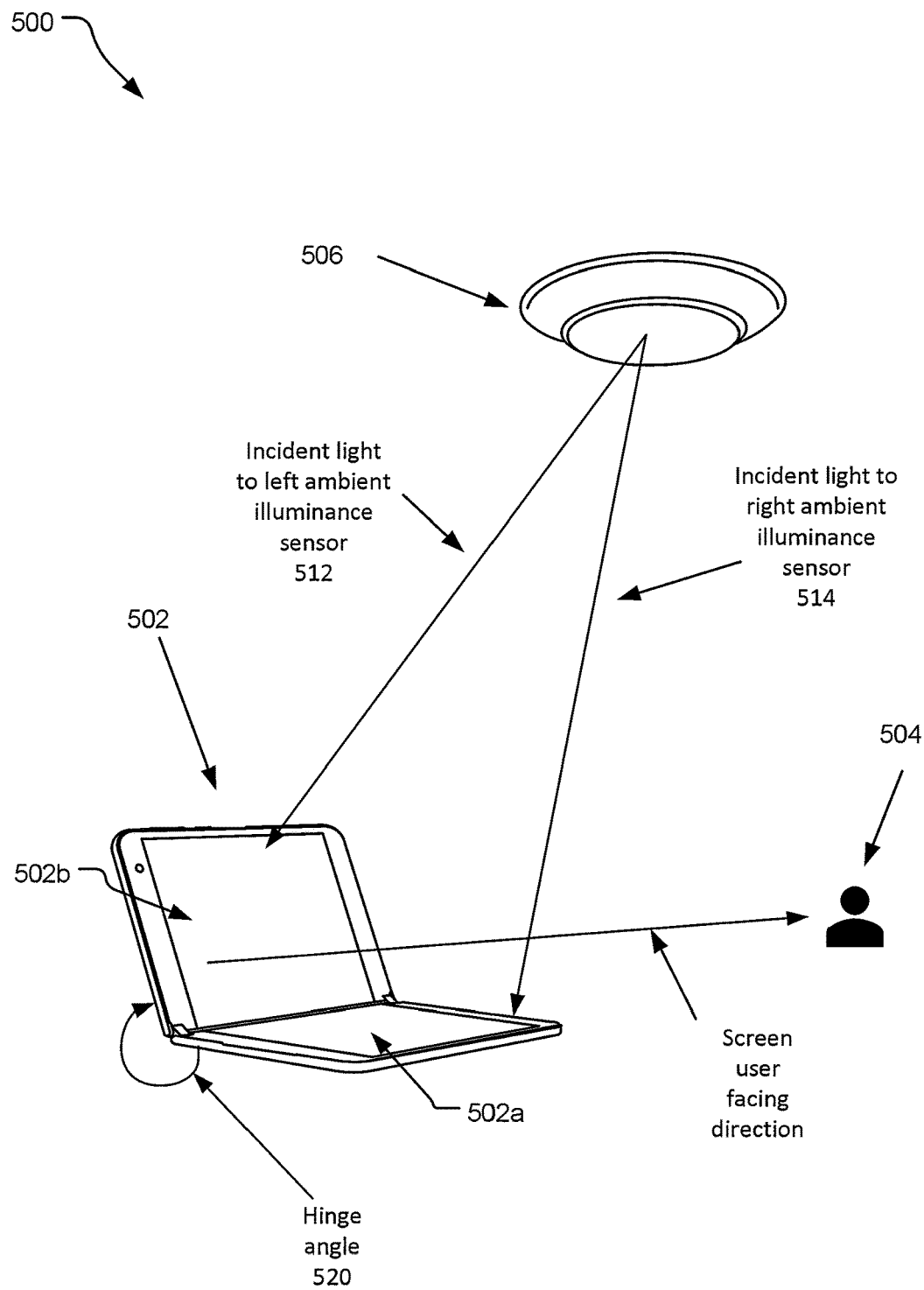
FIG. 5 illustrates an example use mode of the AILGD system disclosed herein.

FIG. 5 illustrates an example use mode 500 of the AILGD system disclosed herein. Specifically, in this mode a computing device 502 is used in a laptop mode. Specifically, the computing device 502 is in a laptop posture facing a user 504. The computing device 502 may include illuminance sensors on each of the displays 502a and 502b and a hinge angle sensor that determines the hinge angle 520 between the displays 502a and 502b. An aggregator, such as a first aggregator 140 disclosed in FIG. 1, receives inputs from the activity subsystems on each of the displays 502a and 502b and the hinge angle sensor to determine the posture of the computing device 502 being a laptop posture, with the first display 502a facing a ceiling containing a light source 506 and the second display 502b facing the user 504.

Subsequently, the aggregator gives higher weight to the illuminance values received from the illuminance sensor of the second display 502b facing the user 504. As a result, the illuminance data provided by the aggregator to the operating system of the computing device 502 prioritizes the incident light to left illuminance sensor 512 over the incident light to the right illuminance senor 514. Thus, the aggregator provides more accurate user facing ambient illuminance data to the operating system of the computing device 502. This enables the operating system to provide better screen luminance adaptation and results in the better user pleasing screen usage experience for the user 504 of the foldable handheld computing device 502.

Thus, by adjusting the weights allocated to the illuminance values based at least in part on the posture information, aggregator more precisely estimates the user facing angle of the computing device 502 in order to populate the appropriate ambient illuminance estimation to be used for the screen luminance adaptation by the operating system of the computing device 502. This results in better user experience when the computing device 502 is used in different postures.

Figure 6:
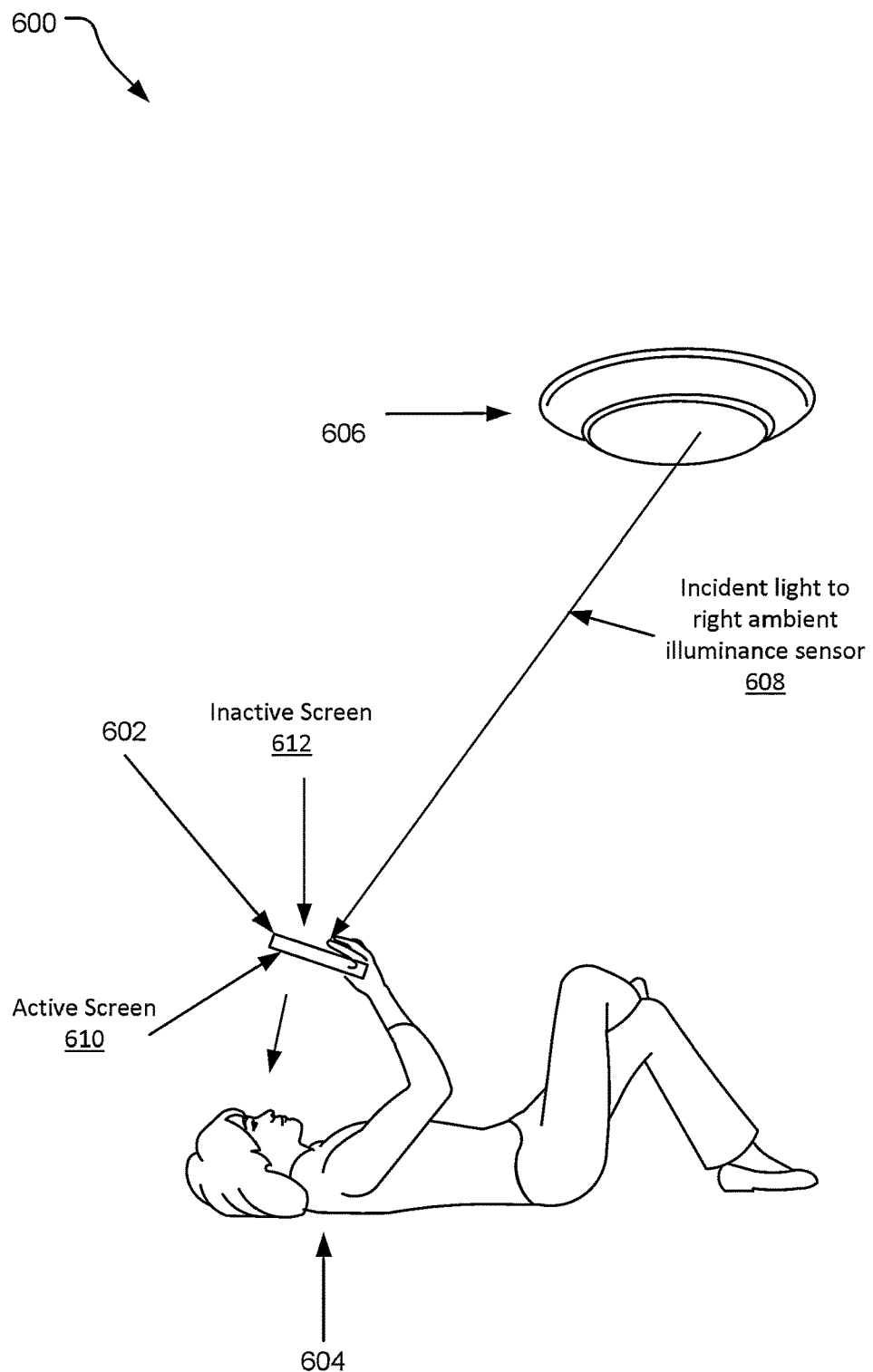
FIG. 6 illustrates another example use mode of the AILGD system disclosed herein.

FIG. 6 illustrates another example use 600 of the AILGD system disclosed herein. Specifically, in the illustrated use mode, a user 604 is using a computing device 602 in a mode where one of the screen is inactive. Specifically, an active screen 610 is facing the user 604 whereas an inactive screen 612 that is not facing the user 604. Furthermore, in this mode the active screen 610 is not facing an ambient light source 606. On the other hand, the inactive screen 612, which may be a right screen, receives incident light 608 on an illuminance sensor located on the right screen.

An aggregator, such as a first aggregator 140 disclosed in FIG. 1, receives inputs from the activity subsystems on each of the screens 610 and 612 and the hinge angle sensor of the computing device 602 to determine the posture of the computing device 602 being a book posture, with the inactive screen 612 facing a ceiling containing a light source 606 and the active screen 610 facing the user 604. Subsequently, the aggregator gives higher weight to the illuminance values received from the illuminance sensor of the active screen 610 facing the user 604. As a result, the illuminance data provided by the aggregator to the operating system of the computing device 602 prioritizes the incident light to active screen 610 over the incident light to the inactive screen 612. This enables the operating system to provide better screen luminance adaptation and results in the better user pleasing screen usage experience for the user 604 of the foldable handheld computing device 602.

Figure 7:
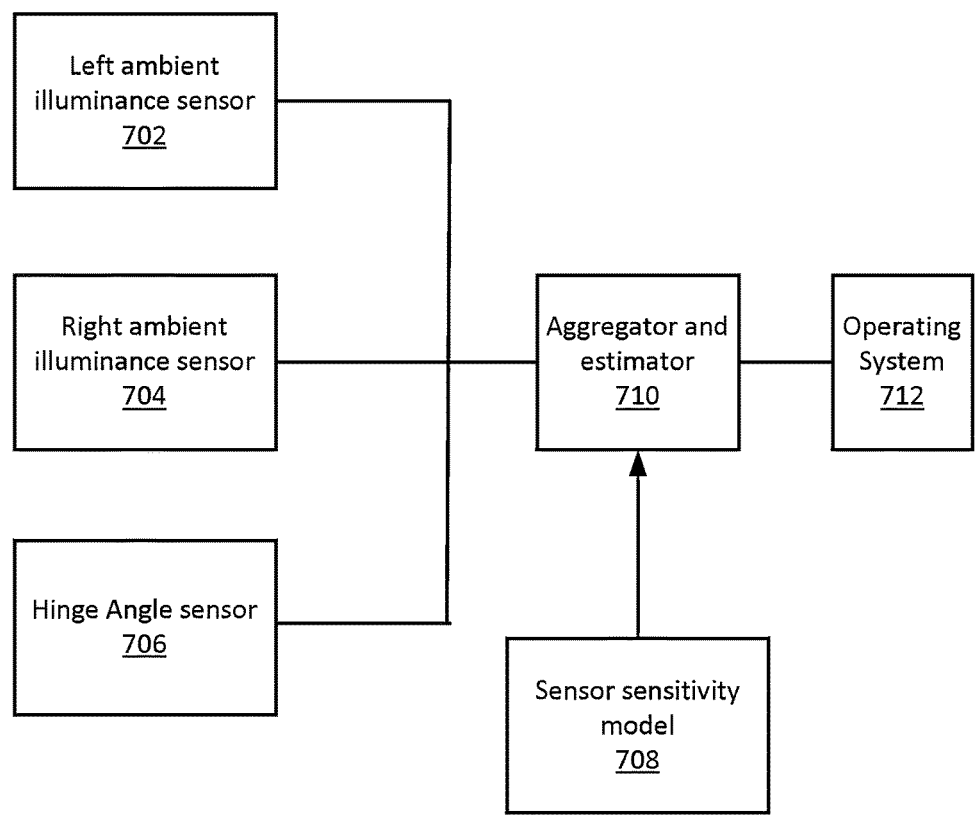
FIG. 7 illustrates an example block diagram of an alternative data aggregator of the AILGD system disclosed herein.

FIG. 7 illustrates an example block diagram of an alternative data aggregator 700 of the AILGD system disclosed herein. Specifically, the data aggregator 700 includes a left ambient illuminance sensor 702 that may be implemented on a left screen of a computing device, a right ambient illuminance sensor 704 that may be implemented on a right screen of the computing device, and a hinge angle sensor 706 that generates a hinge angle value indicating the angle between the left screen and the right screen of the computing device. An aggregator and estimator 710 estimates recognizes the light geometry between the left ambient illuminance sensor 702 and the right ambient illuminance sensor 704 based at least in part on the relative angle between the displays as provided by the hinge angle sensor 706.

Specifically, the aggregator and estimator 710 calculates a ratio of the illuminance values generated by the first illuminance sensor 112 and the second illuminance sensor 114 left ambient illuminance sensor 702 and the right ambient illuminance sensor 704. Subsequently, the aggregator and estimator 710 looks up the sensor sensitivity model 708 to find an incident angle pair that coincides with the ratio of the illuminance values. Subsequently, the aggregator and estimator 710 takes into account the angle between the two displays, as provided by the hinge angle sensor 706, to estimate the incident light angles for sensors on each of the displays. Finally, the aggregator and estimator 710 scales the actual illuminance values as provided by the left ambient illuminance sensor 702 and the right ambient illuminance sensor 704 using the incident light angles. The scaled illuminance values are reported to the operating system 712 of the computing device as part of a luminance report. Scaling the illuminance values provided by the left ambient illuminance sensor 702 and the right ambient illuminance sensor 704 using the incident light angles allows generating an illuminance value reported to the operating system of the computing device to be more reflective of the actual illuminance as experienced by the user. For example, if the computing device is sitting such that a light illuminating a display screen, while bright, is at an angle that generates very little luminance value by the sensor, this luminance value is should be provided a higher weight as the user is viewing that screen with higher luminance. Such consideration of the incident light angles generates better VCO levels for the display screen and therefore resulting in better user experience.

Figure 8:
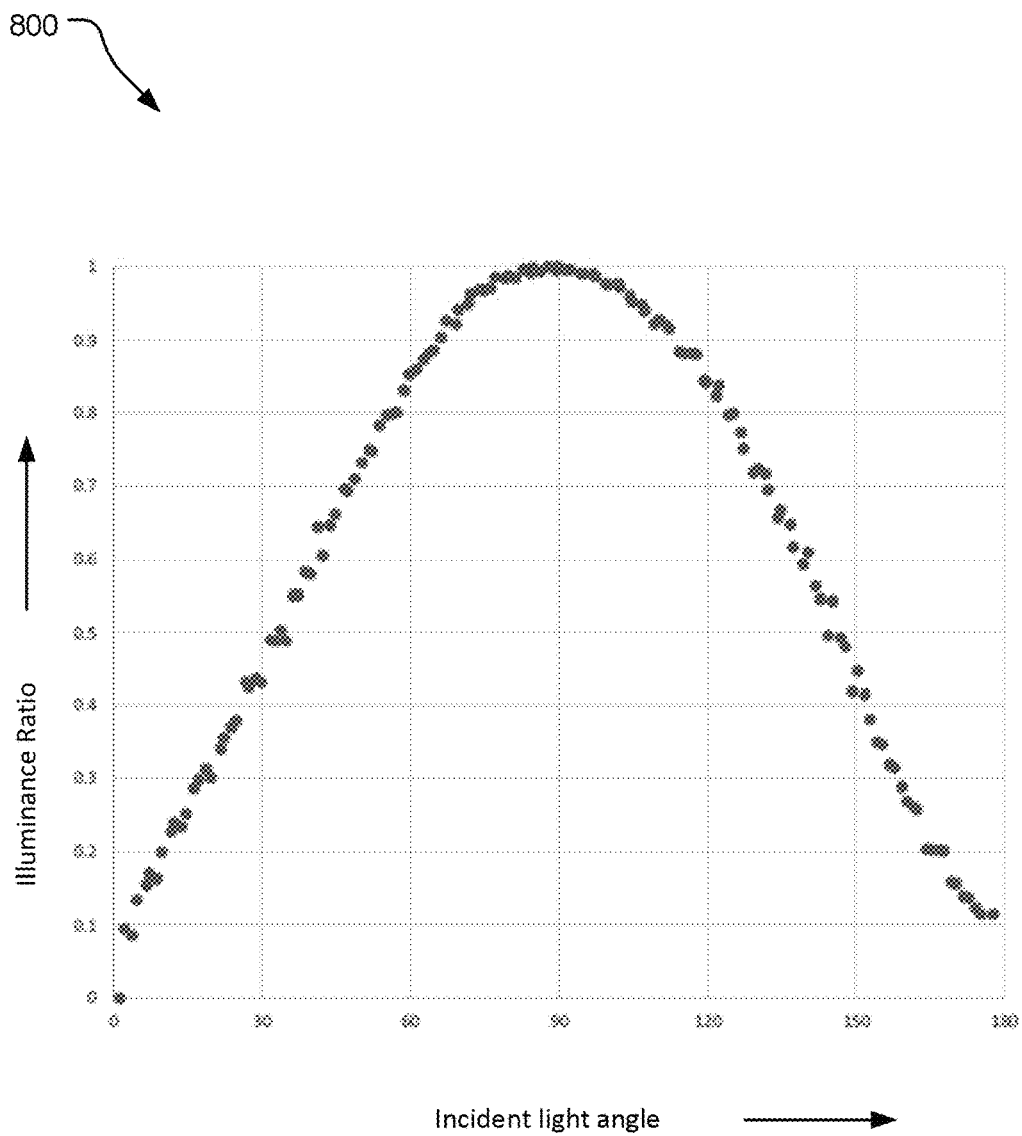
FIG. 8 illustrates an example graph of sensitivity characteristic of an ambient illuminance sensor of the AILGD system disclosed herein.

FIG. 8 illustrates an example graph of sensitivity characteristic of an ambient illuminance sensor of the AILGD system disclosed herein. Specifically, the graph 800 illustrated in FIG. 8 which indicates the illuminance signal generated by the illuminance sensor 112 or 114 as function of the light incidence angle between 0 and 180 degrees, with the highest level of signal, substantially one (1) generated at 90 degrees of light incidence angle and lowest levels of signal, substantially zero (0) generated at 0 degree or 180 degree of light incidence angle.

Figure 9:
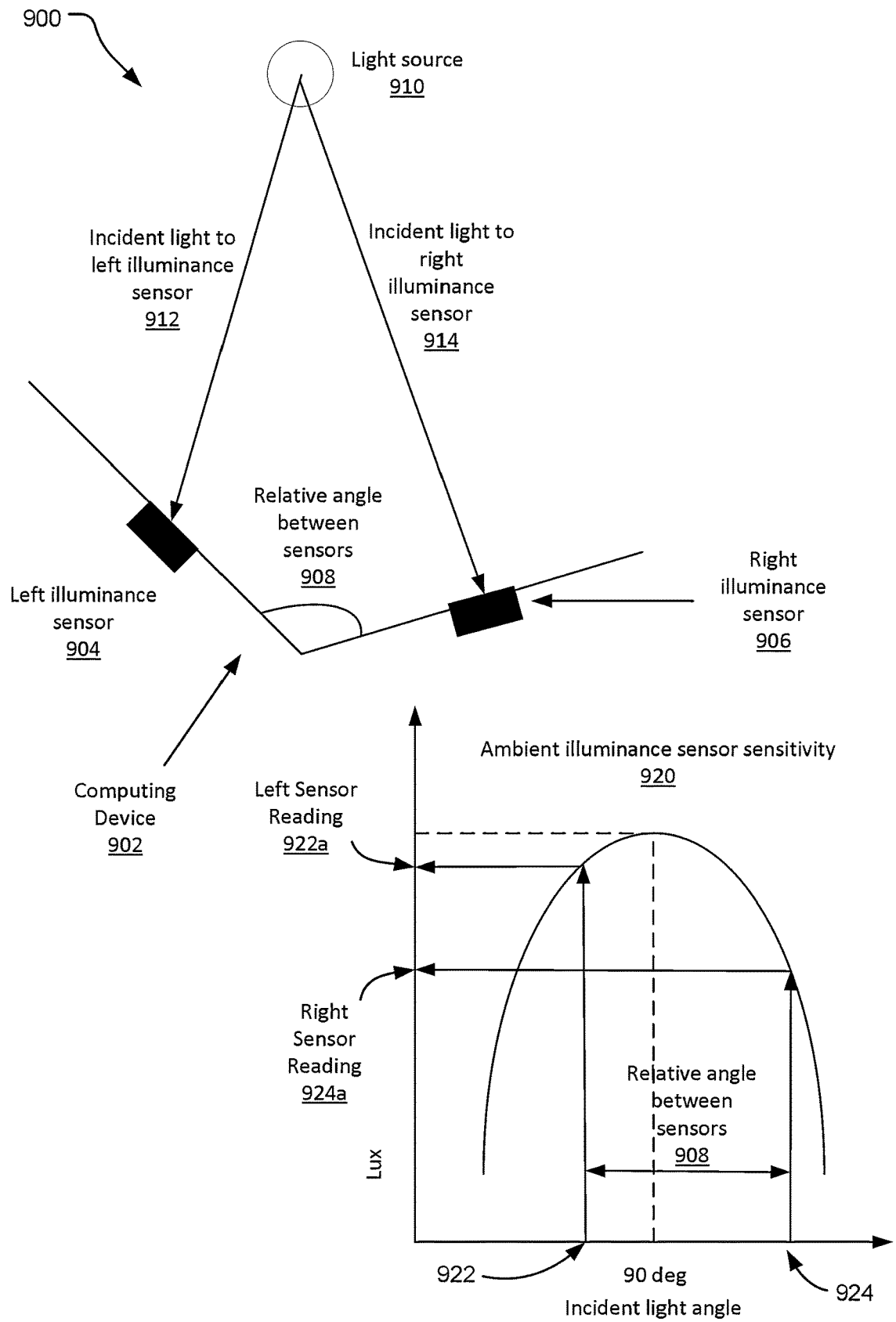
FIG. 9 illustrates an alternative example use mode of the AILGD system disclosed herein with two ambient illuminance sensors facing one light source.

FIG. 9 illustrates an alternative example use mode 900 of the AILGD system disclosed herein with two ambient illuminance sensors facing one light source. Specifically, FIG. 9 illustrates a computing device 902 with a left ambient illuminance sensor 904 on a left display and a right ambient illuminance sensor 906 on a right display. The relative angle between the two displays, and therefore the sensors 904 and 906, is illustrated to by 908. The sensors 904 and 906 may receive light from a light source 910.

The sensitivity of the sensors 904 and 906 to angle of incident light from the light source 910 is illustrated by an ambient illuminance sensor sensitivity graph 920. Specifically, the sensitivity graph 920 gives lux value as a function of the incident light angle on the sensors 904 and 906. For example, if the angle of incident light to the left illuminance sensor 912 is 922, the left sensor reading is as provided by 922a. Similarly, if the angle of incident light to the right illuminance sensor 914 is 924, the left sensor reading is as provided by 924a.

An aggregator such as the second aggregator 150 disclosed in FIG. 1 or the aggregator and estimator 710 disclosed in FIG. 7 scales the actual illuminance values as provided by the left illuminance sensor 904 and the right illuminance sensor 906 using the incident light angles 922 and 924. The scaled illuminance values are reported to an operating system of the computing device 902 as part of the luminance report.

Figure 10:
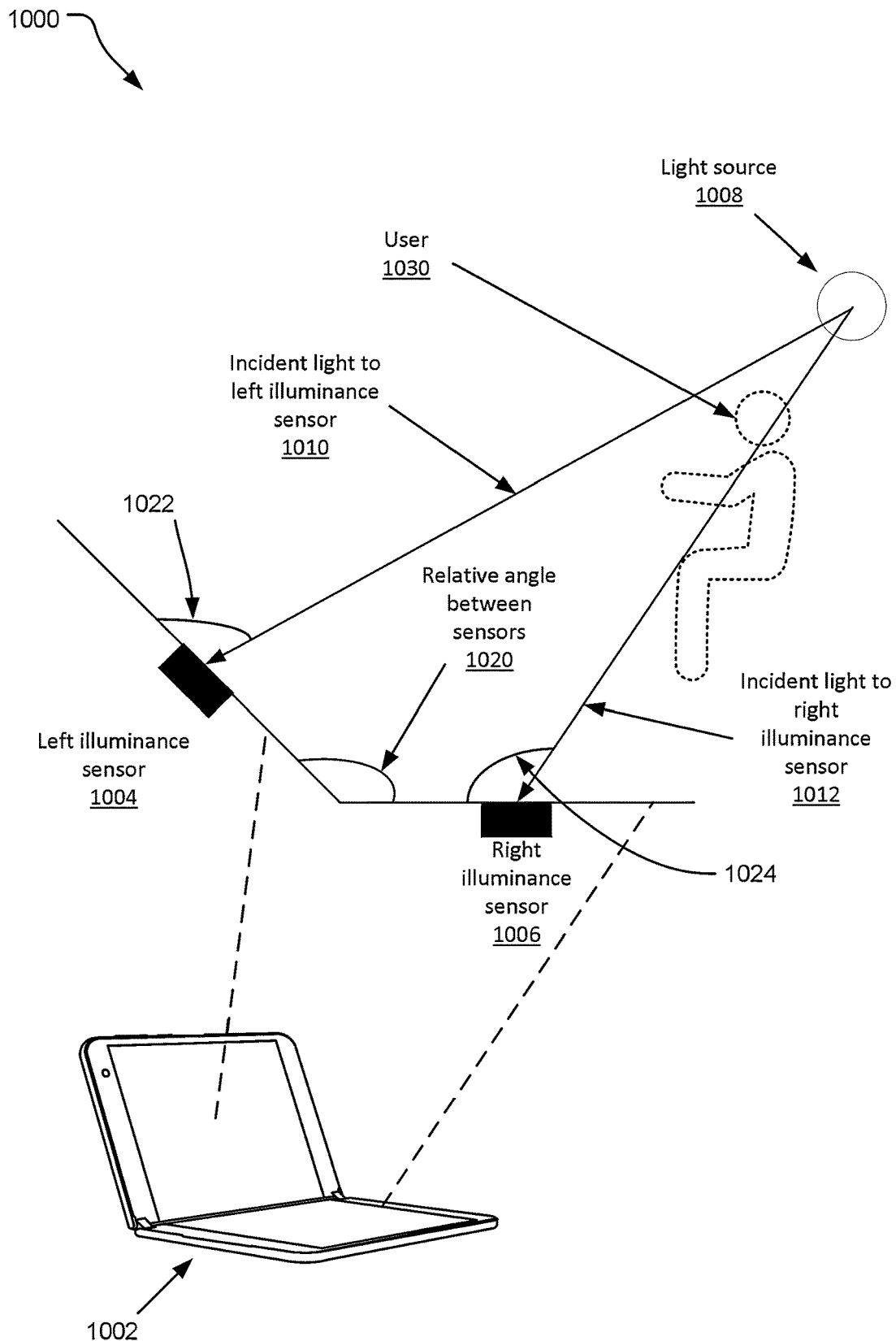
FIG. 10 illustrates another alternative example use mode of the AILGD system disclosed herein with a light source located in an unconventional position.

FIG. 10 illustrates another alternative example use mode 1000 of the AILGD system disclosed herein with a light source 1008 located in an unconventional position. In this mode, a computing device 1002 is in use in a laptop posture and a light source may be behind a user 1030. The computing device 1002 is illustrated to have a left illuminance sensor 1004 and a right illuminance sensor 1006 with a relative angle between the sensors 1004 and 1006 being 1020. The left illuminance sensor 1004 receives incident light 1010 and the right illuminance sensor 1012 receives incident light 1012.

In this mode, the illuminance sensors 1004 and 1006 may report generate unreasonable illuminance data as the incident light 1012 on the right illuminance sensor 1006 may be at least partially blocked by the user 1030. However, an aggregator and estimator system on the computing device, such as the aggregator and estimator 710 disclosed in FIG. 7, may scale the actual illuminance values as provided by the left illuminance sensor 1004 and the right illuminance sensor 1006 using the incident light angles 1022 and 1024. The scaled illuminance values are reported to an operating system of the computing device 1002 as part of the luminance report.

Figure 11:
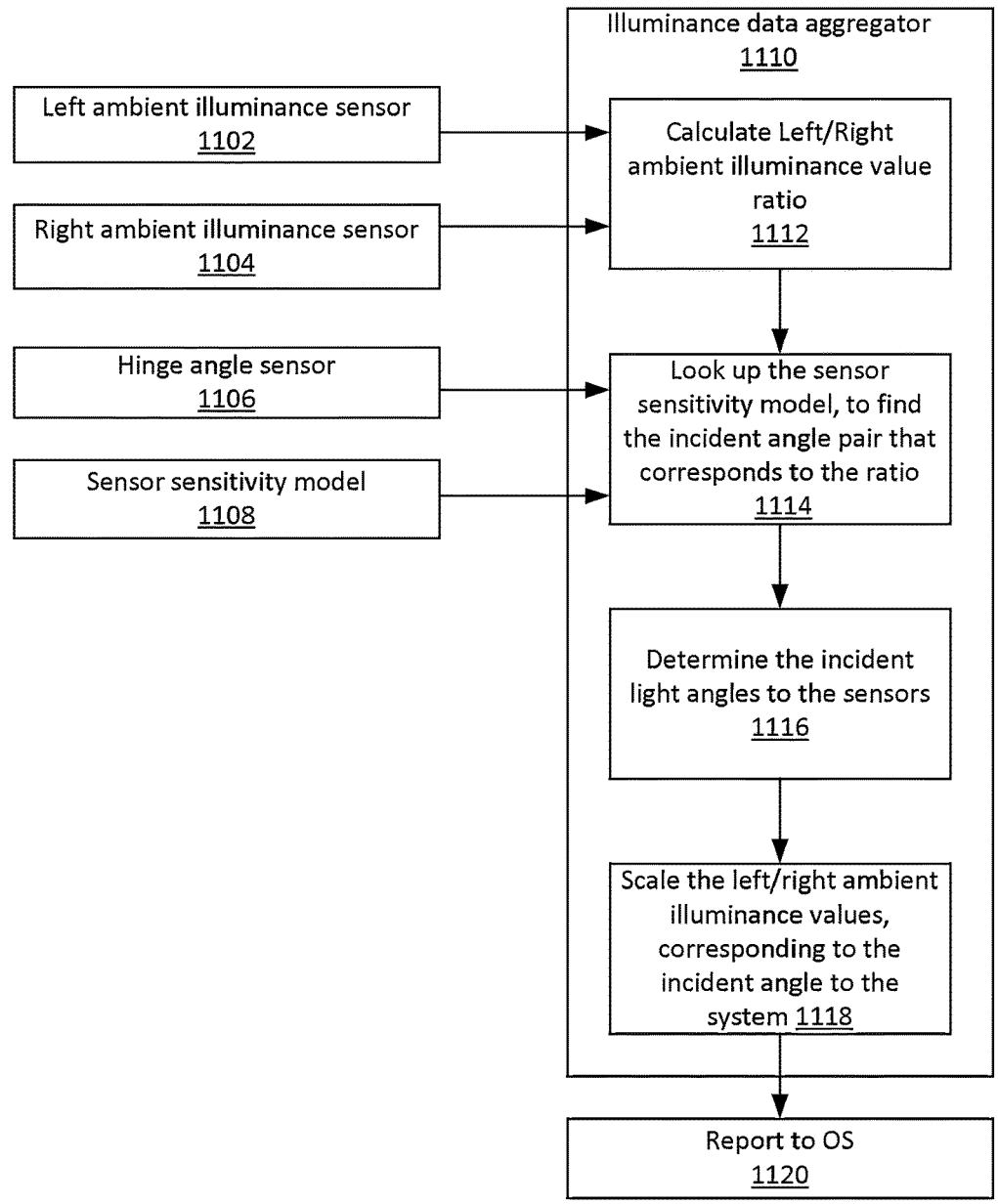
FIG. 11 illustrates an example block diagram of an alternative data aggregator of the AILGD system disclosed herein.

FIG. 11 illustrates an example block diagram 1100 of an illuminance data aggregator 1110 of the AILGD system disclosed herein. The illuminance data aggregator 1110 receives inputs from a left ambient illuminance sensor 1102, a right ambient illuminance sensor 1104, a hinge angle sensor 1106, and a sensor sensitivity model 1108. An Operation 1112 calculates a ratio of the illuminance values received from the left ambient illuminance sensor 1102 and the right ambient illuminance sensor 1104. An operation 1114 uses the ratio and inputs from the hinge angle sensor 1106 to look up the sensor sensitivity model 1108 to find an incident angle pair that corresponds to the ratio.

Subsequently, an operation 1116 determines the incident light angles for each of the sensors using the sensor sensitivity model and an operation 1118 scales the illuminance values from the left ambient illuminance sensor 1102 and the right ambient illuminance sensor 1104 corresponding to the incident angle pair. An operation 1120 reports the scaled illuminance values to an operating system of the computing device.

Figure 12:
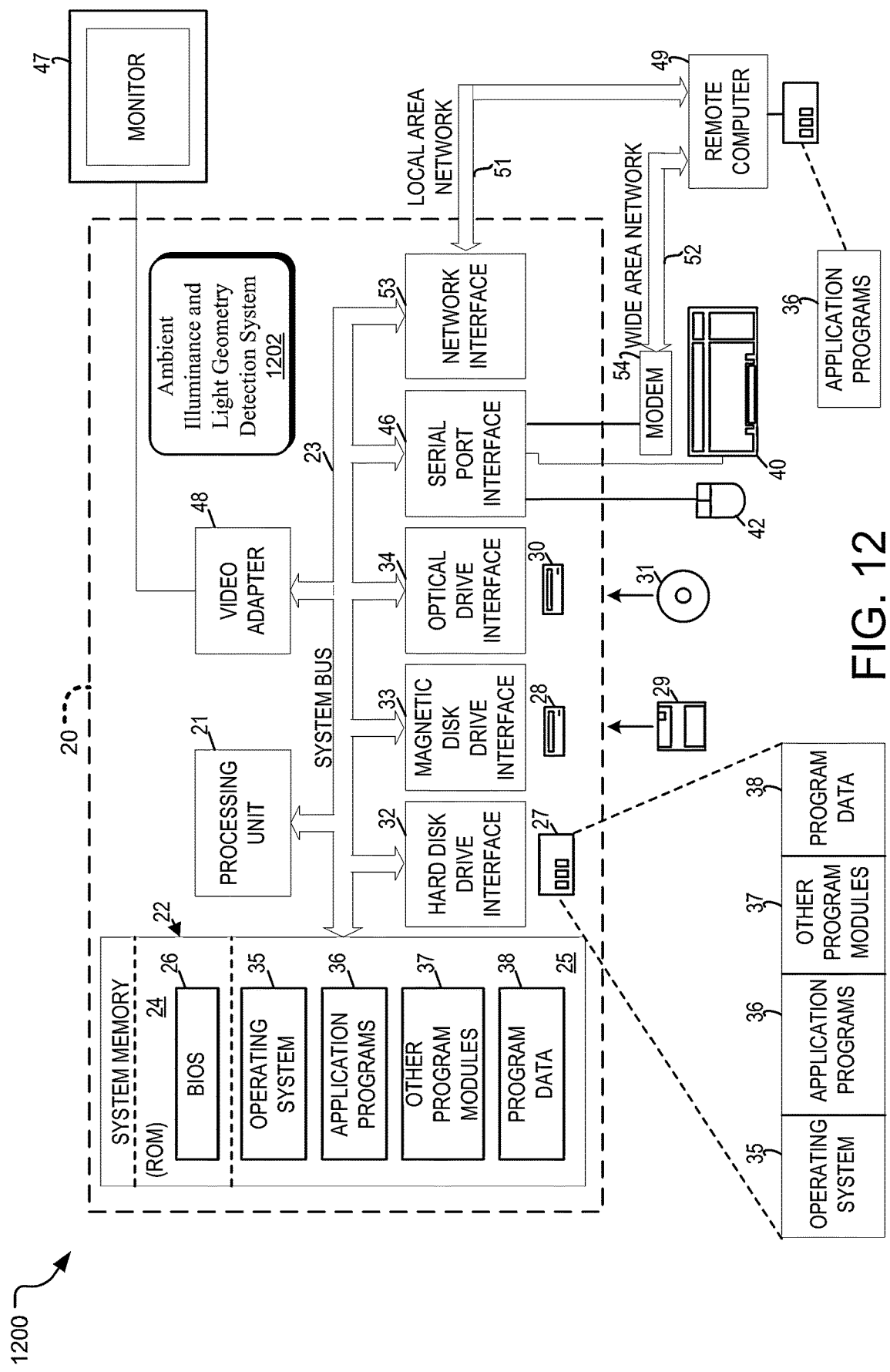
FIG. 12 illustrates an example computing system that may be useful in implementing the described technology and FIG. 13 illustrates example operations of the described technology.

FIG. 12 illustrates an example system 1200 that may be useful in implementing the device capability model sharing system disclosed herein. The example hardware and operating environment of FIG. 12 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 12, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for a device capability model sharing system may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, an AILGD system 1202 may be implemented on the computer 20 as an application program 36 (alternatively, the AILGD system 1202 may be implemented on a server or in a cloud environment). The AILGD system 1202 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

A physical article of manufacture disclosed herein includes one or more tangible computer-readable storage media, encoding computer-executable instructions for executing on a computer system a computer process, the computer process including receiving a hinge angle between two displays of a foldable computing device and screen activity of each of the displays of the foldable computing device; determining foldable computing device posture information based at least in part on the hinge angle and the screen activity of each of the displays; determining a user facing display of the foldable computing device based at least in part on the device posture information and the screen activity of the displays; assigning differential weights to an illuminance value received from an illuminance sensor of the user facing display compared to an illuminance value received from an illuminance sensor of the non-user facing display; and generating an aggregate weighted average illuminance by applying the differential weights to the illuminance values of each of the displays.

A method disclosed herein includes receiving a hinge angle between two displays of a foldable computing device, illuminance values from illuminance sensors of the displays, and screen activity of each of the displays of the foldable computing device, determining foldable computing device posture information based at least in part on the hinge angle and the screen activity of each of the displays, determining a user facing display of the foldable computing device based at least in part on the device posture information and the screen activity of the displays, assigning differential weights to an illuminance value received from an illuminance sensor of the user facing display compared to an illuminance value received from an illuminance sensor of the non-user facing display, and generating an aggregate weighted average illuminance by applying the differential weights to the illuminance values of each of the displays.

A foldable computing device disclosed herein includes memory, one or more processor units, two displays movably attached to each other, each of the two displays including a light sensor to generate illuminance values, an ambient illuminance report generator, stored in the memory and executable by the one or more processor units, the ambient illuminance report generator encoding computer-executable instructions on the memory for executing on the one or more processor units a computer process, the computer process including receiving a hinge angle between two displays of a foldable computing device and screen activity of each of the displays of the foldable computing device, determining foldable computing device posture information based at least in part on the hinge angle and the screen activity of each of the displays, determining a user facing display of the foldable computing device based at least in part on the device posture information and the screen activity of the displays, assigning differential weights to an illuminance value received from illuminance sensor of the user facing display compared to an illuminance value received from an illuminance sensor of the non-user facing display, and generating an aggregate weighted average illuminance by applying the differential weights to the illuminance values of each of the displays.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

Figure 13:
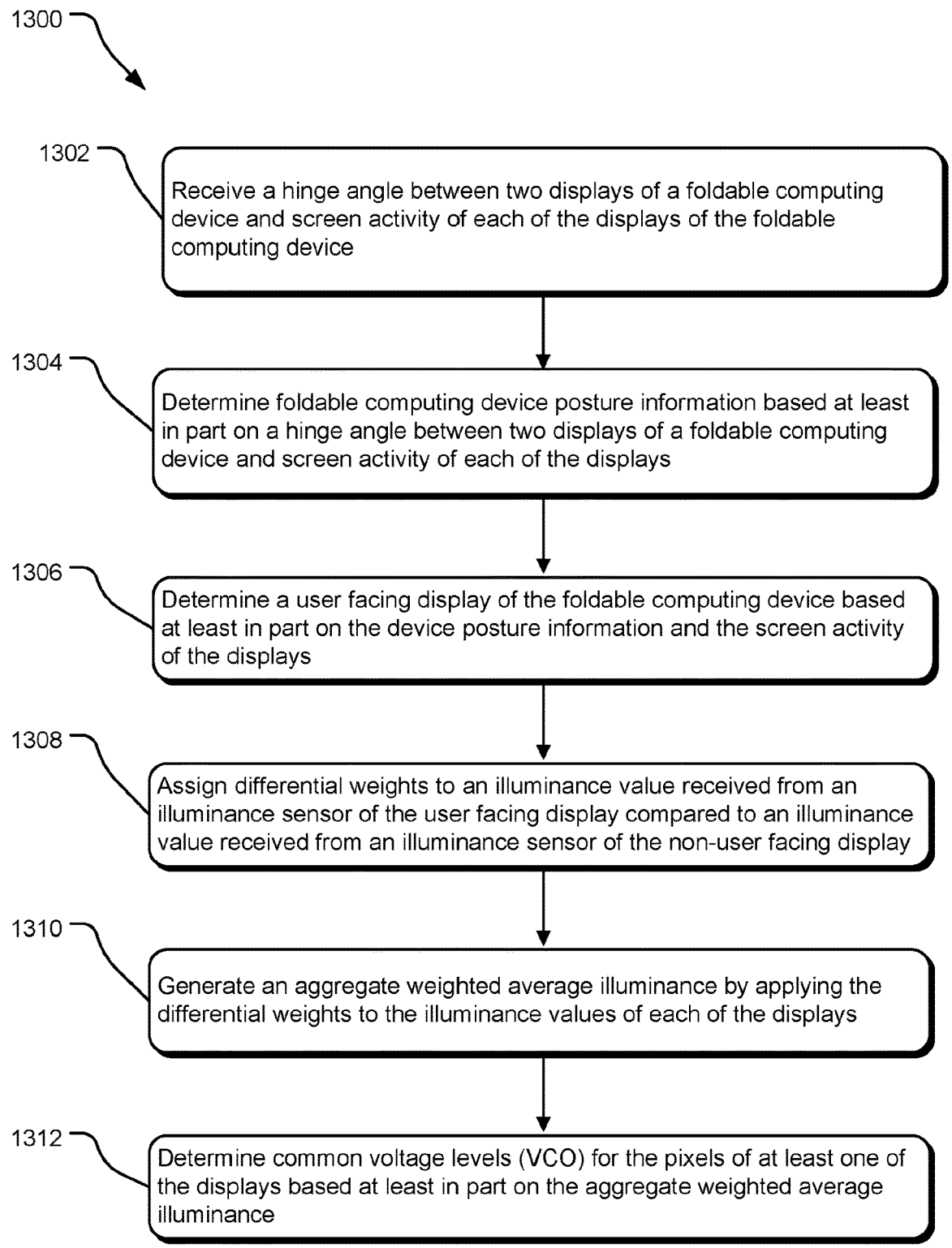

FIG. 13 illustrated example operations of the technology disclosed herein. An operation 1302 receives a hinge angle between two displays of a foldable computing device and screen activity of each of the displays of the foldable computing device. Operation 1304 determines foldable computing device posture information based at least in part on a hinge angle between two displays of a foldable computing device and screen activity of each of the displays. An operation 1306 determines a user facing display of the foldable computing device based at least in part on the device posture information and the screen activity of the displays. An operation 1308 assigns differential weights to an illuminance value received from an illuminance sensor of the user facing display compared to an illuminance value received from an illuminance sensor of the non-user facing display. An operation 1310 generates an aggregate weighted average illuminance by applying the differential weights to the illuminance values of each of the displays. An operation 1312 determines common voltage levels (VCO) for the pixels of at least one of the displays based at least in part on the aggregate weighted average illuminance.

What is claimed is:

1. A physical article of manufacture including one or more memory devices, encoding computer-executable instructions for executing on a computer system a computer process, the computer process comprising:
    determining foldable computing device posture information based at least in part on a hinge angle between two displays of a foldable computing device and screen activity of each of the displays;
    determining a user facing display of the foldable computing device based at least in part on the device posture information and the screen activity of the displays;
    assigning differential weights to an illuminance value received from an illuminance sensor of the user facing display compared to an illuminance value received from an illuminance sensor of the non-user facing display;
    generating an aggregate weighted average illuminance by applying the differential weights to the illuminance values of each of the displays; and
    determining common voltage levels (VCO) for the pixels of at least one of the displays based at least in part on the aggregate weighted average illuminance.

2. The physical article of manufacture of claim 1, wherein the computer process further comprises receiving the hinge angle between two displays of a foldable computing device and the screen activity of each of the displays of the foldable computing device.

3. The physical article of manufacture of claim 1, wherein the computer process further comprises:
    generating a ratio of the illuminance values received from illuminance sensors of the non-user facing display; and
    determining an incident angle pair based at least in part on the ratio of the illuminance values and a sensor sensitivity model.

4. The physical article of manufacture of claim 3 wherein the sensor sensitivity model provides sensitivity of the illuminance values received from illuminance sensors to incident light angles for the sensors.

5. The physical article of manufacture of claim 3, wherein the computer process further comprises scaling the illuminance values received from illuminance sensors using the incident light angles for the sensors.

6. The physical article of manufacture of claim 1, wherein the screen activity of each of the displays identifies the type of activity for each of the displays of the foldable computing device.

7. The physical article of manufacture of claim 6, wherein the screen activity of each of the displays identifies the level of activity for each of the displays of the foldable computing device for a predetermined time.

8. The physical article of manufacture of claim 6, wherein assigning differential weights to illuminance values received from illuminance sensors further comprises assigning differential weights based at least in part on activity level of each of the displays.

9. A method, comprising:
receiving a hinge angle between two displays of a foldable computing device, illuminance values from illuminance sensors of the displays, and screen activity of each of the displays of the foldable computing device;
determining foldable computing device posture information based at least in part on a hinge angle between two displays of a foldable computing device and screen activity of each of the displays;
determining a user facing display of the foldable computing device based at least in part on the device posture information and the screen activity of the displays;
assigning differential weights to an illuminance value received from an illuminance sensor of the user facing display compared to an illuminance value received from an illuminance sensor of the non-user facing display;
generating an aggregate weighted average illuminance by applying the differential weights to the illuminance values of each of the displays; and
determining common voltage levels (VCO) for the pixels of at least one of the displays based at least in part on the aggregate weighted average illuminance.

10. The method of claim 9, further comprising generating a luminance report for an operating system of the foldable computing device based at least in part on the aggregate weighted average illuminance.

11. The method of claim 9, further comprising:
generating a ratio of the illuminance values received from illuminance sensors of the non-user facing display; and
determining an incident angle pair based at least in part on the ratio of the illuminance values and a sensor sensitivity model.

12. The method of claim 11, wherein the sensor sensitivity model provides sensitivity of the illuminance values received from illuminance sensors to incident light angles for the sensors.

13. The method of claim 9, wherein the screen activity of each of the displays identifies the type of activity for each of the displays of the foldable computing device.

14. The method of claim 13, wherein the screen activity of each of the displays identifies the level of activity for each of the displays of the foldable computing device for a predetermined time.

15. A foldable computing device, comprising:
memory;
one or more processor units;
two displays movably attached to each other, each of the two displays including a light sensor to generate illuminance values;
an ambient illuminance report generator, stored in the memory and executable by the one or more processor units, the ambient illuminance report generator encoding computer-executable instructions on the memory for executing on the one or more processor units a computer process, the computer process comprising:
receiving a hinge angle between two displays of a foldable computing device and screen activity of each of the displays of the foldable computing device;
determining foldable computing device posture information based at least in part on a hinge angle between two displays of a foldable computing device and screen activity of each of the displays;
determining a user facing display of the foldable computing device based at least in part on the device posture information and the screen activity of the displays;
assigning differential weights to an illuminance value received from an illuminance sensor of the user facing display compared to an illuminance value received from an illuminance sensor of the non-user facing display;
generating an aggregate weighted average illuminance by applying the differential weights to the illuminance values of each of the displays; and
determining common voltage levels (VCO) for the pixels of at least one of the displays based at least in part on the aggregate weighted average illuminance.

16. The foldable computing device of claim 15, wherein the computer process further comprises generating a ratio of the illuminance values received from illuminance sensors of the non-user facing display and determining an incident angle pair based at least in part on the ratio of the illuminance values and a sensor sensitivity model.

17. The foldable computing device of claim 16, wherein the sensor sensitivity model provides sensitivity of the illuminance values received from illuminance sensors to incident light angles for the sensors.

18. The foldable computing device of claim 17, wherein the computer process further comprises scaling the illuminance values received from illuminance sensors using the incident light angles for the sensors.

* * * * *